United States Patent
Borie

[19]

[11] Patent Number: 6,012,696
[45] Date of Patent: Jan. 11, 2000

[54] EASEL TRANSPORTER

[76] Inventor: Donald Ray Borie, 710 Goodrich Ct. / P.O. Box 87, Platteville, Colo. 80651

[21] Appl. No.: 08/961,289

[22] Filed: Oct. 30, 1997

Related U.S. Application Data

[60] Provisional application No. 60/029,667, Oct. 30, 1996.

[51] Int. Cl.[7] .................................................. A47B 97/04
[52] U.S. Cl. ............................................................ 248/461
[58] Field of Search .................................. 248/447, 461, 248/448, 449, 129, 166, 171; 312/231, 280, 281, 294; 280/47.131, 47.27, 47.33, 47.2

[56] References Cited

U.S. PATENT DOCUMENTS

| | | | |
|---|---|---|---|
| 654,841 | 7/1900 | MacDonald | 312/231 |
| 693,422 | 2/1902 | Murphy | 280/47.27 X |
| 914,427 | 3/1909 | King | 280/47.27 X |
| 2,014,057 | 9/1935 | Rogers | 280/47.27 X |
| 3,165,367 | 1/1965 | Rose | 280/47.33 |
| 3,168,363 | 2/1965 | Monsour | 248/461 X |
| 3,202,471 | 8/1965 | Wilson | 248/461 X |
| 3,540,787 | 11/1970 | Ford | 312/231 |
| 4,057,215 | 11/1977 | Stettler | 248/460 |
| 4,149,763 | 4/1979 | Delahaie | 312/231 |
| 4,372,630 | 2/1983 | Fuhri | 312/231 |
| 5,399,009 | 3/1995 | Hiner | 312/231 |
| 5,519,919 | 5/1996 | Lee | 248/171 X |
| 5,769,431 | 6/1998 | Cordova | 280/47.131 X |
| 5,799,958 | 9/1998 | Bishop | 280/47.2 |

OTHER PUBLICATIONS

Hiner; PCT/US94/06371 filed Jun. 6, 1994.

Primary Examiner—Ramon O. Ramirez
Attorney, Agent, or Firm—Rick Martin

[57] ABSTRACT

An easel transporter 100 is easily attached to a French easel. The easel transporter has wheels 5 and a handle 4 mounted on a frame 1 allowing the French easel to be easily rolled to the chosen location. The device also has a drawer 2 with a cover 3 for transporting materials. A central opening 10 allows the central leg D2 of a French easel to extend for set up of the French easel. The easel transporter is quickly and easily attached to a French easel by clasps 11, tabs 22, and tray 17. Release of the locking pins allows the wheels 5 to be folded to a storage position B, thereby allowing transport of the easel transporter under an airliner seat or other similarly cramped space.

2 Claims, 8 Drawing Sheets

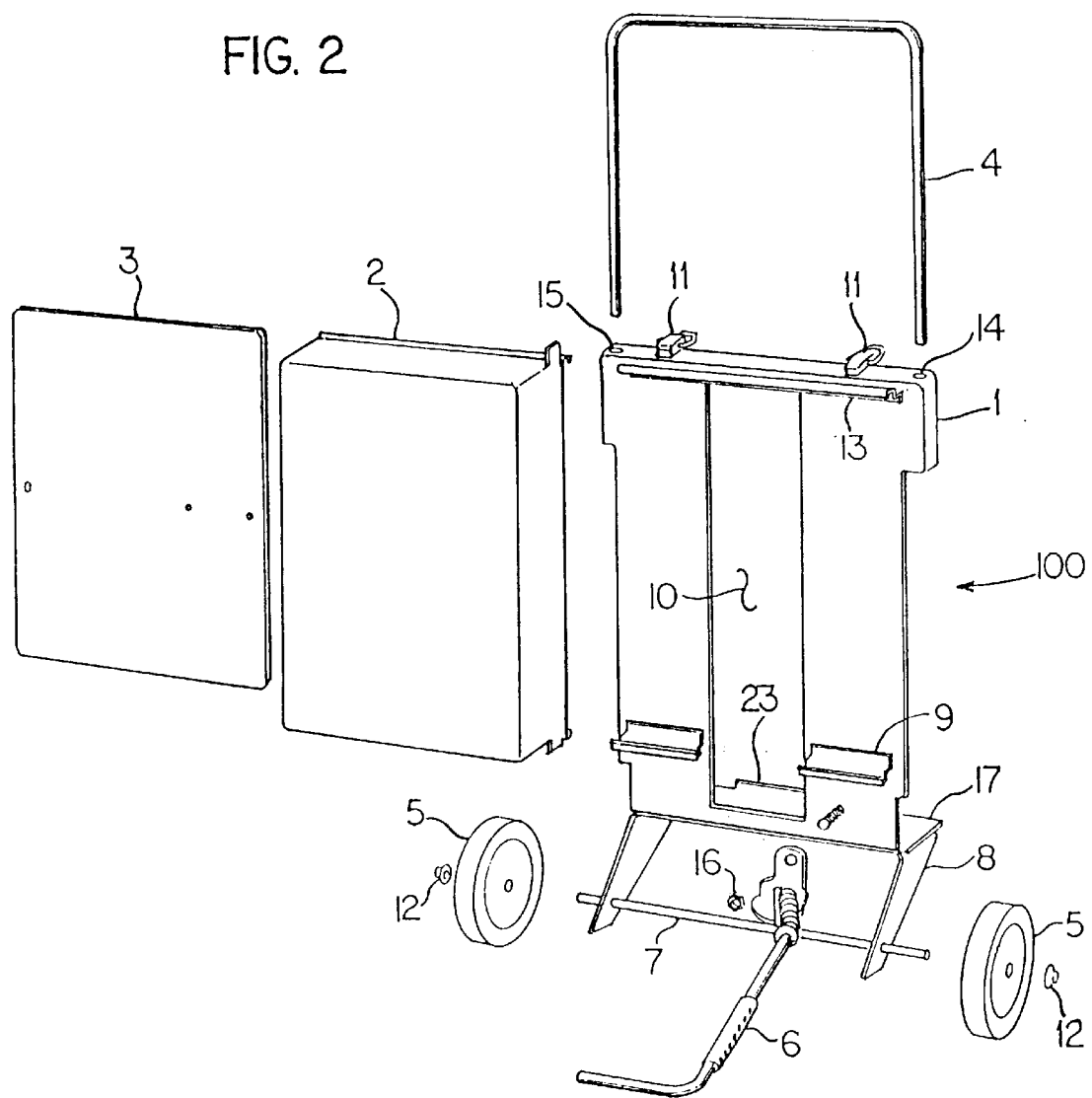

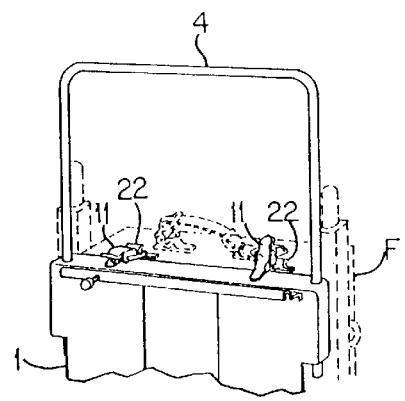
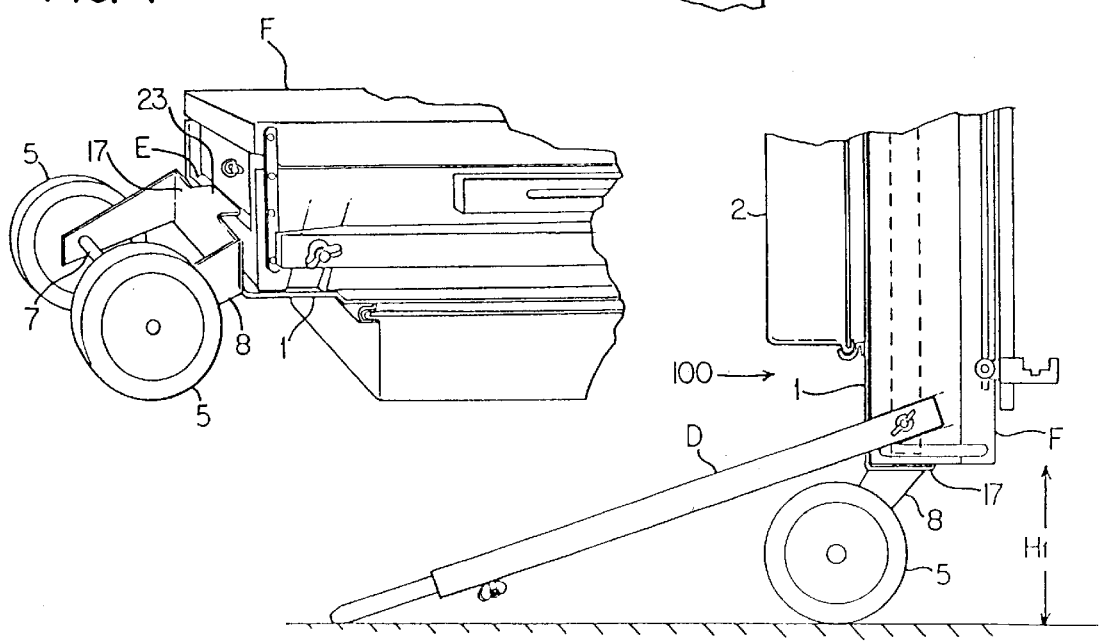

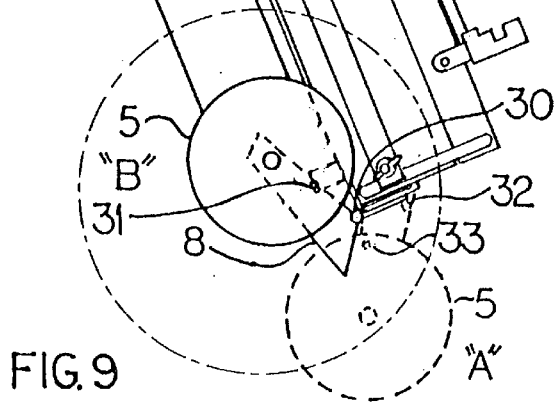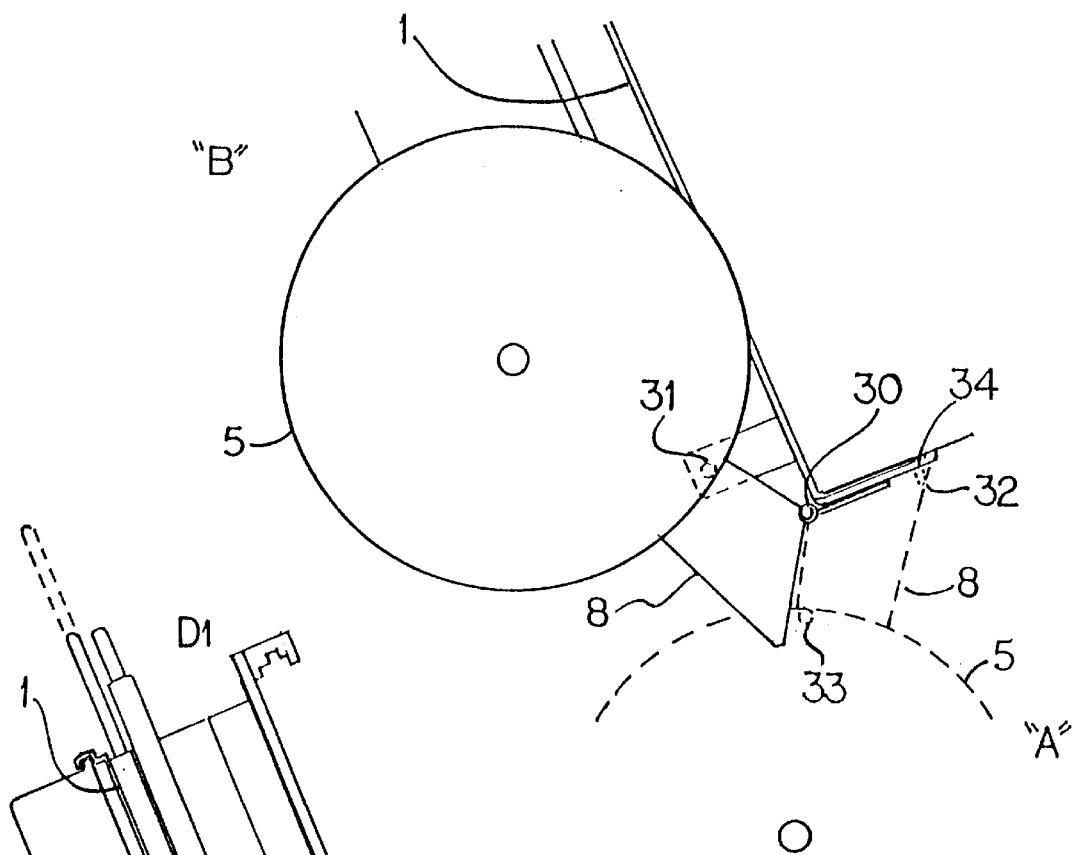
FIG. 9
FIG. 10-DETAIL

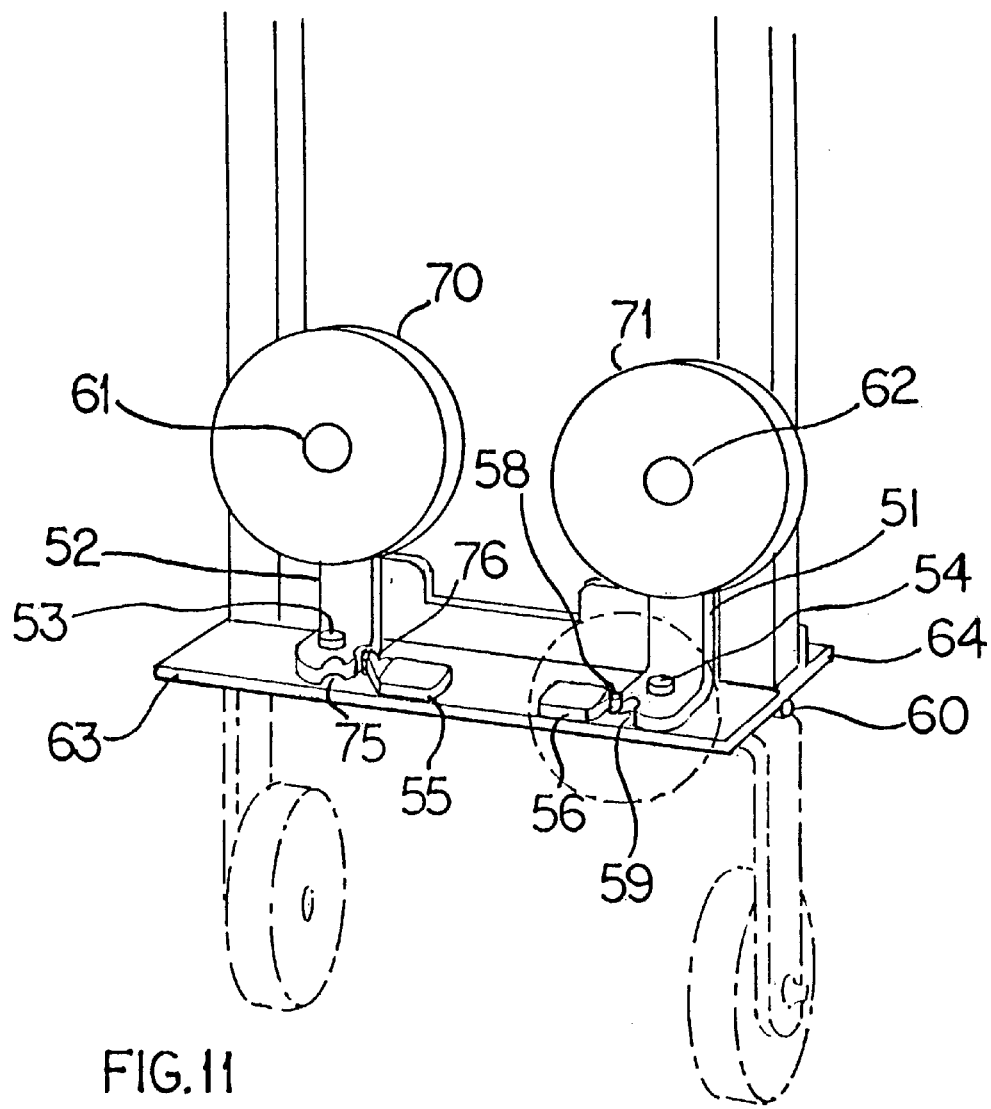
FIG. 11
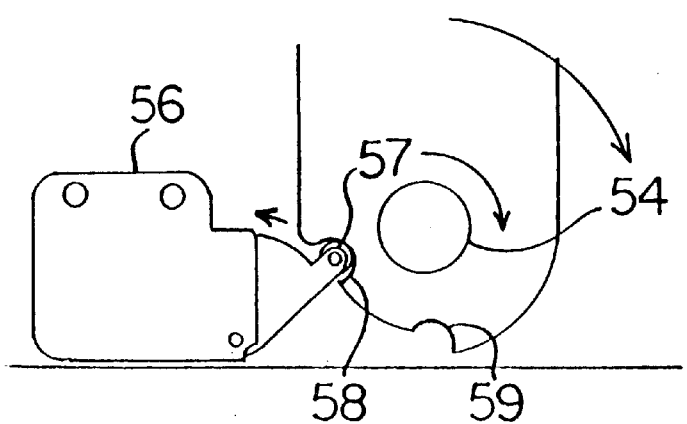
FIG. 14 - DETAIL

FIG. 16-DETAIL

EASEL TRANSPORTER

CROSS-REFERENCE TO RELATED APPLICATION

This application claims the benefit of U.S. Provisional Application No. 60/029,667 dated Oct. 30, 1996.

FIELD OF INVENTION

The present invention relates to an easel transporter having wheels for transport and a drawer and which may be easily attached to the easel.

BACKGROUND OF THE INVENTION

Various types of portable easel devices are known, including a device referred to as a French easel. The French easel includes adjustable tripod legs and carrying case which unfolds to provide for an adjustable-height easel. However, the French easel is rather awkward and difficult to transport in the folded position because the tripod legs and other components are located on the exterior of the case where they can interfere with other objects. No wheels or chassis is provided.

Representative of the art is:

U.S. Pat. No. 654,841 (1900) to MacDonald discloses an improved folding combined artist's cabinet and easel.

U.S. Pat. No. 3,165,367 (1965) to Rose discloses an artist's easel for holding paint canvases readily transportable to an outdoor site.

U.S. Pat. No. 4,057,215 (1977) to Stettler discloses a collapsible easel for artists to support canvases and artist's boards.

U.S. Pat. No. 4,372,630 (1983) to Fuhri discloses a device which serves alternatively as a drawing board and which provides a carrying case for art supplies and the components of the easel and support legs.

The present invention fastens to a french easel to provide a chassis having wheels. A handy drawer is attached to the chassis. Thus, a user can easily transport his French easel over the ground.

The prior art consists primarily of easels which are transportable but which do not have a means of transport other than being carried by the artist. The present invention solves this problem by providing a quickly attachable means of transporting an artist's French easel over the ground.

SUMMARY OF THE INVENTION

The main aspect of the present invention is to provide an easily attachable chassis having wheels onto a French easel.

Another aspect of the present invention is to provide the chassis with a storage drawer.

Other aspects of this invention will appear from the following description and appended claims, reference being made to the accompanying drawings forming a part of this specification wherein like reference characters designate corresponding parts in the several views.

The present invention is attached to an artist's French easel. The easel transporter comprises a frame, handle, drawer, wheels, and kickstand and provides a means of transporting the easel from place to place. The components are attached to the frame. Attached to the frame is a drawer for artist's materials. The drawer slides in a track running across the width of the frame opposite the side for receiving the easel. The drawer slides along the frame track to completely enclose and contain the central foldable leg of the French easel. The frame also has a central opening to accommodated the folding/unfolding of the central leg of the French easel. A telescoping handle extends from the top of the frame opposite the wheels. Two wheels are attached to the base of the frame n such a way so as to allow rolling transport of the frame and French easel when pulled by the telescoping handle. A kickstand mounted to the base of the frame allows the user to "park" the easel transporter in an upright, easily accessible position. The frame is attached to a French easel with quick-release clasps.

BRIEF DESCRIPTION OF THE DRAWINGS

FIG. 2 is an exploded view of the preferred embodiment.

FIG. 4 is a perspective front view of the preferred embodiment showing the first step for attachment to a French easel.

FIG. 5 is a perspective view of the preferred embodiment showing the second step for attachment to a French easel.

FIG. 6 is a side plan view of the preferred embodiment.

FIG. 9 is a side plan view of an alternate embodiment with the French easel attached.

FIG. 10 is a plan view of the hinge locking assembly of the alternate embodiment shown in FIG. 9.

FIG. 11 is a back perspective view showing an alternate embodiment of the wheel assembly.

FIG. 14 shows a perspective detail of the s rut ratchet assembly.

FIG. 16 is a detail perpective view of the kickstand slot 98.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Figure 1:
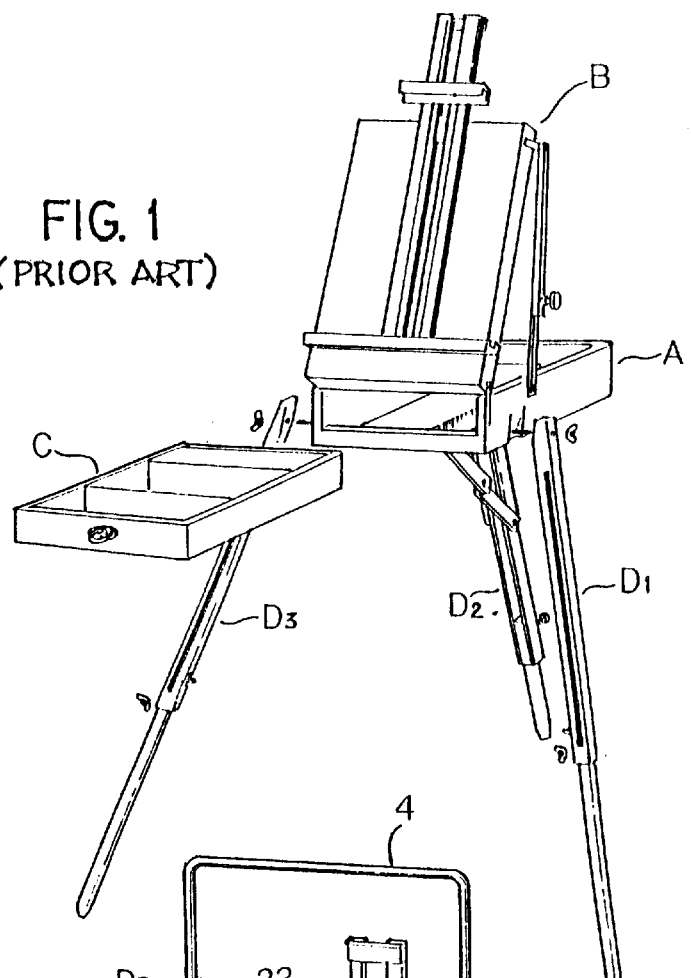
FIG. 1 (prior art) is an exploded view a French easel.

Referring first to FIG. 1 a traditional French easel is shown. The body A has attached to it the drawing surface B. Contained within the body A is the drawer C. Attached to the exterior of body A are foldable legs D1, D2, D3. Legs D1, D2, D3 are pivotally attached to body A in such a way so as to form a tripod when extended and in use. Legs D1, D2, D3 telescope to various lengths to accommodate variations in terrain (not shown)as well as provide for a variable height for the French easel.

FIG. 2 depicts an exploded view of the easel transporter 100 without the French easel attached. The drawer 2 is slidingly engaged in upper track 13 and lower track 9. Upper track 13 and lower track 9 are each attached to frame 1. Cover 3 is attached to drawer 2 so that materials (not shown) may be contained within. Cover 3 also serves as a tabletop in the field during use. Handle 4 is adjustably attached through hole 14 and hole 15 to frame 1. Kickstand 6 is attached to frame 1 with screw 16 below lower track 9. Bracket 8 is attached to the bottom of frame 1. Axle 7 is attached to bracket 8. Wheels 5 are rotatingly attached to axle 7 with lock nuts 12. Opening 10 is centrally located in frame 1 to allow extension of a folding leg D (not shown) from a French easel. Clasps 11 are attached to the top of frame 1 which provide the means by which a French easel F (not shown) is attached to frame 1. The base of a French easel (not shown) is mounted within tray 17, located at the base of frame 1 opposite the kick stand 6. The French easel F (not shown) is held in place by clasps 11 at the top of frame 1 and by lip 23 on the edge of tray 17. The tabs 22 on French easel F in FIG. 3 interconnect with the corresponding clasps 11 atop frame 1. The clasps 11 and tabs 22 are part of the present invention.

Figure 3:
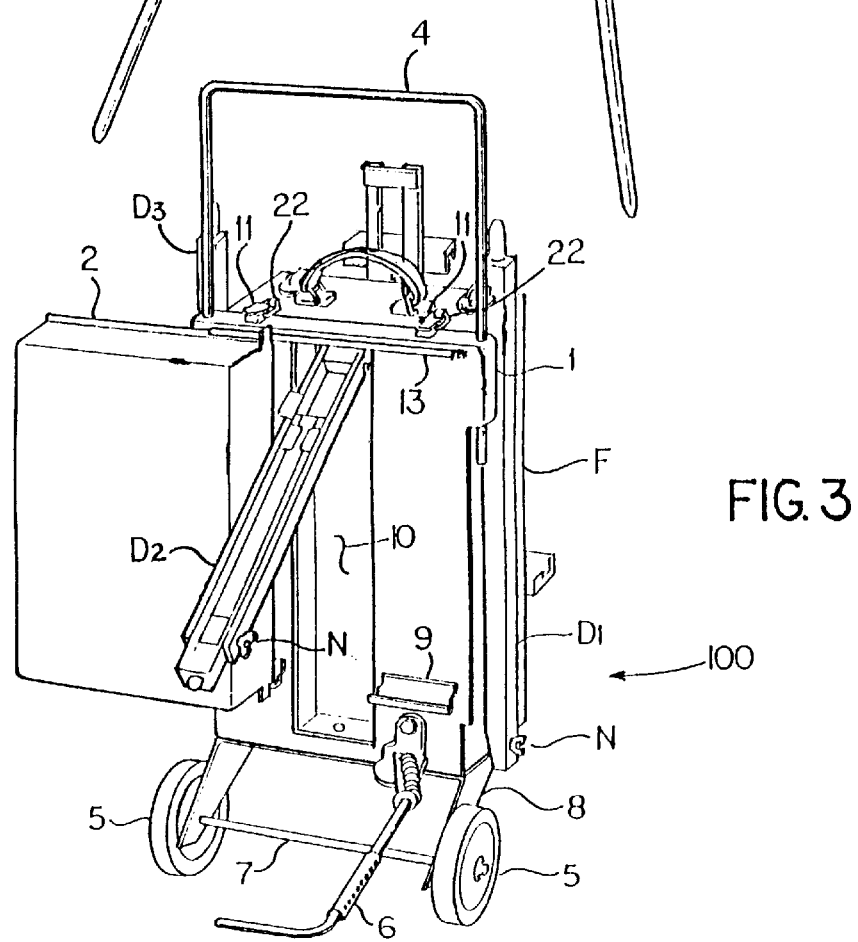
FIG. 3 is a perspective back view of the preferred embodiment with the French easel attached.

FIG. 3 depicts the assembled easel transporter 100 with a French easel F attached. Foldable legs D1, D2, D3 are is pivotally connected to the French easel F. Leg D2 articulates through opening 10. The foldable legs may be extended by loosening wingnut N and adjusting as desired. Drawer 2 slides within and between upper track 13 and lower track 9. Handle 4 may be extended from frame 1 by the user (not shown). Clasps 11 connect with tabs 22 which attach the French easel F to the frame 1. Wheels 5 and axle 7 are rotatingly attached to bracket 8. Bracket 8 is attached to the base of frame 1. Kickstand 6 is shown in its retracted position. Adjustable legs D1, D3 are attached to the side of frame 1 by wingnuts N. They are shown in their extended position.

FIG. 4 shows the first step of mating the base of French easel F to tray 17 in frame 1. Lip 23 on tray 17 provides a positive mechanical connection to the base edge E of French easel F.

FIG. 5 shows the second step of attaching French easel F to frame 1. Clasps 11 attach to tabs 22 mounted on the French easel F. The base of French easel F rests in tray 17.

FIG. 6 is a side plan view of the French easel F attached to the easel transporter 100. Foldable leg D1 is in the extended position. Foldable leg D and D3 (not shown) are elevated by the transporter 100 to height H1 thereby facilitating leg setup. French ease F is attached to frame 1 in tray 17.

Figure 7:
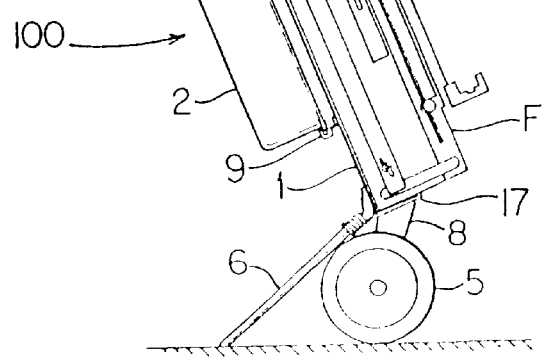
FIG. 7 is a side plan view of the preferred embodiment in a park mode with the French easel attached.

FIG. 7 depicts a side plan view of the easel transporter 100. French easel F is contained within tray 17, Clasp 11 connected to tab 22 attaches the top of French easel F to the top of frame 1. Handle 4 is shown in the extended position. The easel transporter is shown in the "park" configuration with the kickstand 6 in the extended position and supporting the device. Foldable leg D1 is shown in the retracted position in readiness for movement of the easel.

Figure 8:
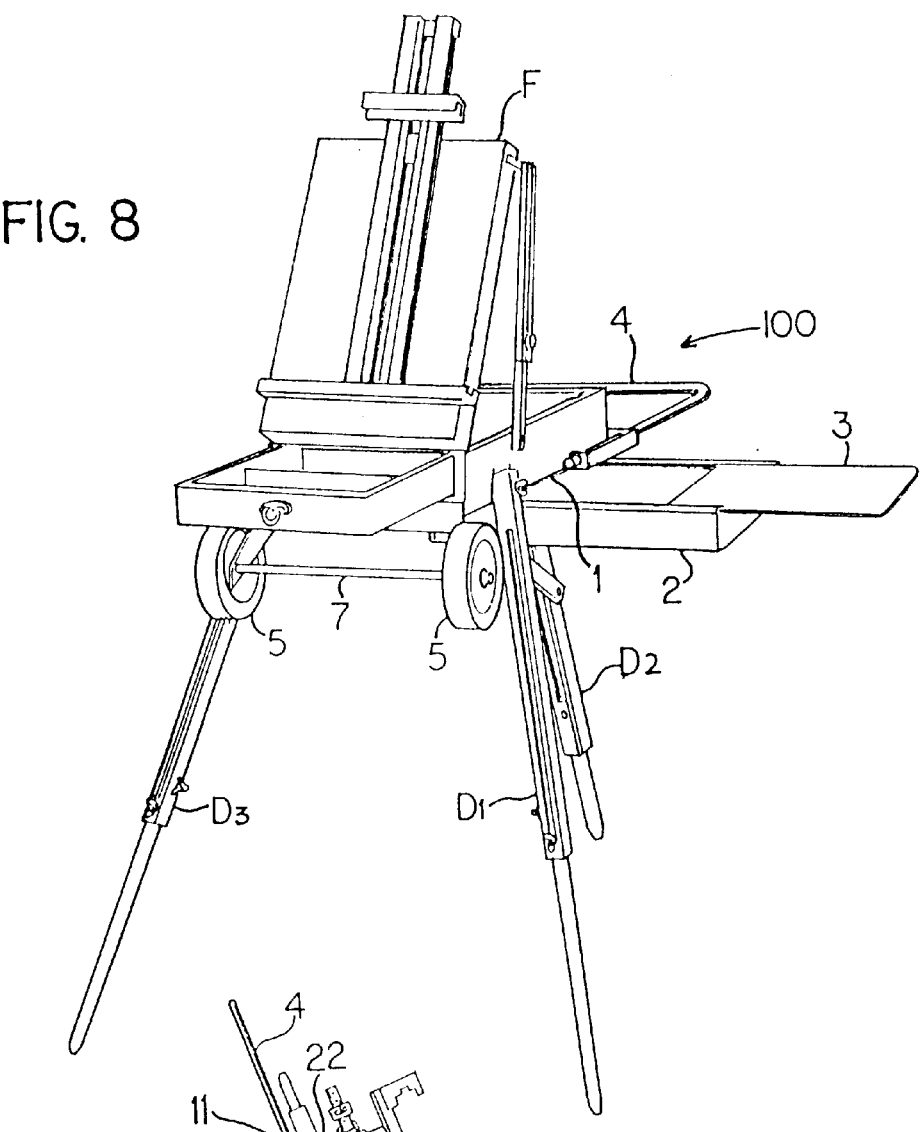
FIG. 8 is a perspective view of the preferred embodiment fully deployed with the French easel attached.

FIG. 8 depicts the easel transporter 100 in the fully deployed mode with an attached French easel F. Foldable legs D1, D2, D3 are extended with frame 1 supporting the body of the French easel F. Drawer 2 is extended from frame 1. Cover 3 is shown partially open on drawer 2. Handle 4 may be extended as shown or retracted into the frame 1 to reduce the possibility of it being struck inadvertently by the artist.

FIG. 9 depicts an alternate embodiment of the transporter 100 wherein the wheels fold up. Piano hinge 30 is attached to the base of frame 1 and to bracket 8. Position A shows the wheels 5 and bracket 8 in the "in-use" position. Piano hinge 30 allows bracket 8 to be folded up to a position B adjacent to the back of frame 1. Position B allows the transporter 100 to be stored under an airliner's seat or other equally cramped storage area.

FIG. 10 is a plan view of the hinge locking assembly. As shown in FIG. 9, the bracket 8 is held in position A by the banana plug 32, known in the art, inserted through hole 34. Release of banana plug 32 allows the piano hinge 30 to rotate allowing bracket 8 to be folded into position B adjacent to the back of frame 1. Bullet plug 31, known in the art, inserts into hole 33 in bracket 8 which holds bracket 8 in folded position B. Bracket 8 may be moved to position A to allow use of the wheels by retracting bullet plug 31 until it clears hole 33. Bracket 8 then rotates to position A. Bracket 8 is then locked in place when hole 34 locks over banana plug 32.

FIG. 11 is a back perspective view showing an alternate embodiment of the wheel assembly. Wheels 70 and 71 are attached to struts 51 and 52 respectively by axels 61 and 62. Struts 51 and 52 are rotatably attached to plate 63 by pins 53 and 54 respectively. Plate 63 is attached to base 64 by hinge 60. Plate 63 rotates about hinge 60 so that wheels 70,71 may be extended into the operating position as discussed in FIGS. 9 and 10. The wheels may also be retracted into the position shown in this FIG. 11 so the easel transporter may be stored under an airline passenger seat. Ratchet 55 and 56 hold the wheel struts 52 and 51 respectively in either the extended or retracted position. As shown in FIG. 14, a detail of the strut ratchet assembly, ratchet 55 cooperates with detent 76 in strut 52 with the strut 52 in the retracted position. Ratchet 55 cooperates with detent 75 in strut 52 with the strut 52 in the extended position. Ratchet 56 cooperates with detent 58 in strut 51 with the strut 51 in the retracted position. Ratchet 56 cooperates with detent 59 in strut 51 with the strut 51 in the extended position.

Figure 12:
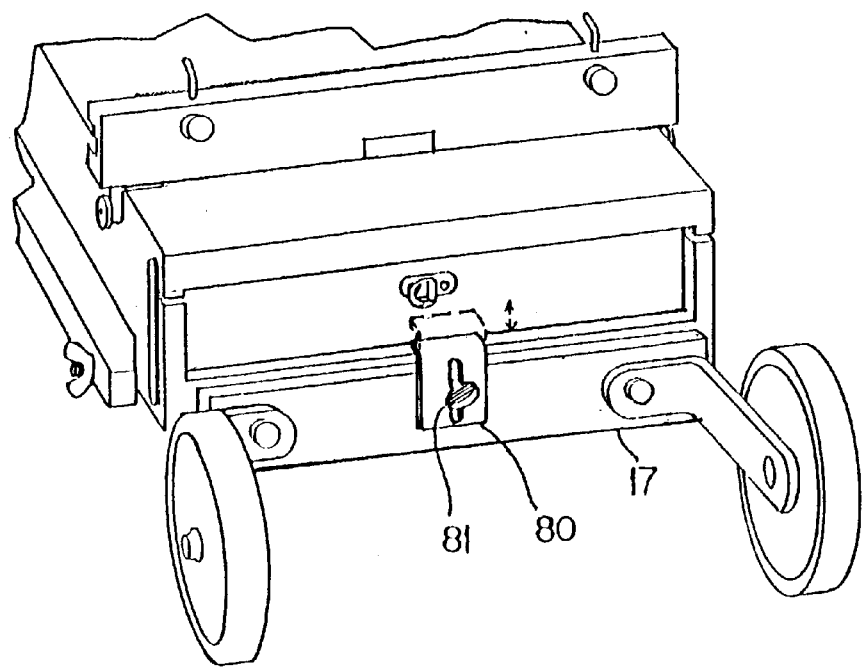
FIG. 12 shows a perspective detail of an alternate embodiment of a case retaining clip.

FIG. 12 shows a perspective detail of an alternate embodiment of a case retaining clip. Clip 80 is adjustably attached to tray 17. The position of clip 80 may be adjusted to accomodate a number of easels by loosening and then tightening thumbscrew 81 once the desired position of the clip is achieved.

Figure 13:
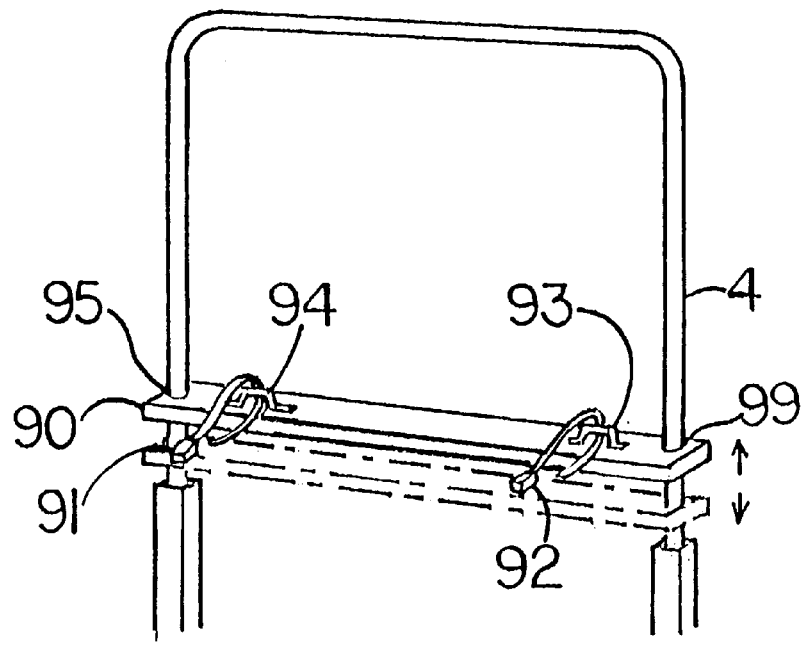
FIG. 13 shows a perspective detail of retaining bar 90.

FIG. 13 shows a perspective detail of retaining bar 90. Retaining bar 90 has holes 95 which allow retaining bar 90 to slide along handle 4. This allows the retaining bar to be adjusted to accomodate a variety of easels. Tie straps 91 and 92 are used to securely attach an easel to the easel transporter. Tie straps 91 and 92 are attached to the easel transporter at eyelets 94 ans 93 respectively.

Figure 15:
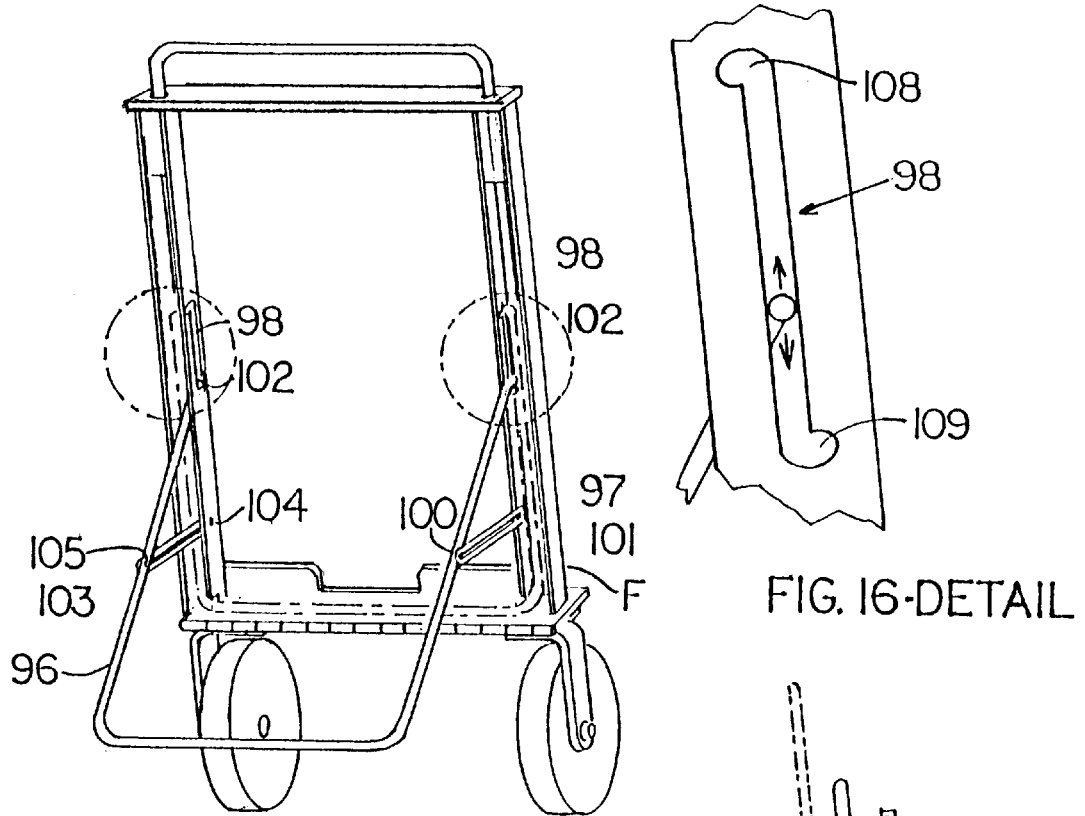
FIG. 15 is a perspective view of an alternate embodiment of the kickstand.

FIG. 15 is a perspective view of an alternate embodiment of the kickstand. Kickstand 96 is slidingly attached to a side of the frame F. Pins 102 slide within slots 98. Strut 97 and strut 103 are attached to kickstand 96 and frame F with pins 101 and 104 respectively. To deploy the kickstand it is pulled out from the frame by the user. This causes pins 102 to slide downward in slots 98. Struts 97 and 103 pivot about pins 101 and 104 thereby causing kickstand 96 to be extended outward. Each of slots 98 have detent 108 and 109 thereby allowing each of pins 102 to be mechanically retained in either the open or closed position.

FIG. 16 is a detail perspective view of the kickstand slot 98.

Figure 17:
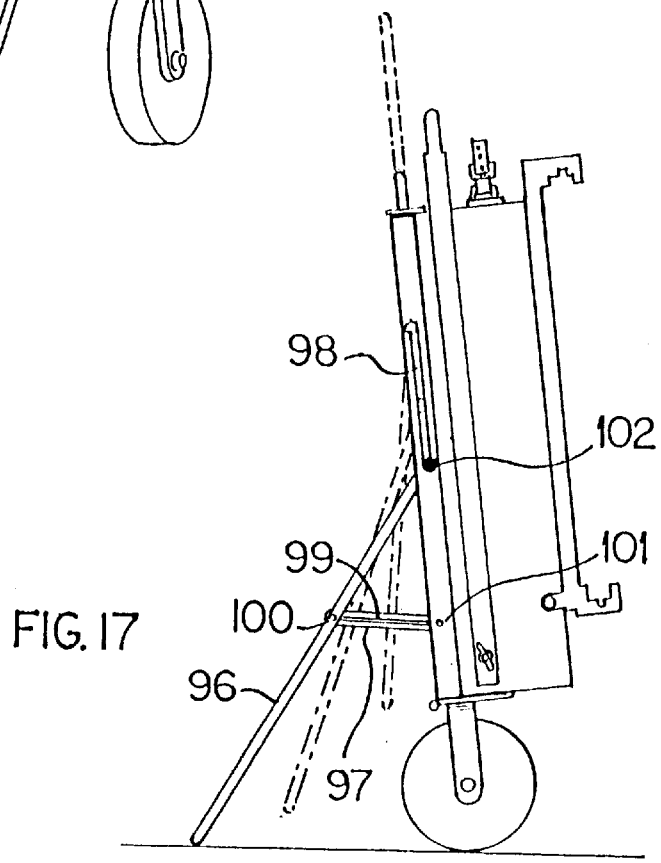
FIG. 17 is a side plan view of the deployed or open kickstand 96.

FIG. 17 is a side plan view of the deployed or open kickstand 96. The figure shows the position of strut 97 and pin 102 in relation to slot 98.

Although the present invention has been described with reference to preferred embodiments, numerous modifications and variations can be made and still the result will come within the scope of the invention. No limitation with respect to the specific embodiments disclosed herein is intended or should be inferred.

I claim:

1. An easel transporter for a box shaped easel having a bottom surface and three foldable tripod legs, said transporter comprising:

a frame having a mounting surface to receive a bottom surface of an easel;

said frame having a central slot to enable a tripod leg to fold/unfold therethrough;

said frame having a tray at its bottom portion to receive an easel;

said bottom portion further comprising wheels and a kickstand;

said frame further comprising a top portion having clasps to engage the easel and a handle for pulling the transporter;

a drawer having a detachable cover that serves as a tabletop;

said drawer further comprising an upper track and a lower track mounted on a rear surface of said frame; and said drawer slidingly engaged with said upper and lower tracks.

2. An easel transporter for a box shaped easel having a bottom surface and three foldable tripod legs, said transporter comprising:

a frame having a mounting surface to receive a bottom surface of an easel;

said frame having a central slot to enable a tripod leg to fold/unfold therethrough;

said frame having a tray at its bottom portion to receive an easel;

said bottom portion further comprising wheels and a kickstand;

said frame further comprising a top portion having clasps to engage the easel and a handle for pulling the transporter;

a drawer comprising a detachable cover that serves as a tabletop and an upper track and a lower track mounted on a rear surface of said frame; and said drawer slidingly engaged with said upper and lower tracks.

* * * * *